(12) United States Patent
Huang

(10) Patent No.: US 10,488,019 B2
(45) Date of Patent: Nov. 26, 2019

(54) ADJUSTABLE ROUND LIGHT SPOT TORCH

(71) Applicant: Rongshen Huang, Foshan (CN)

(72) Inventor: Rongshen Huang, Foshan (CN)

( * ) Notice: Subject to any disclaimer, the term of this patent is extended or adjusted under 35 U.S.C. 154(b) by 70 days.

(21) Appl. No.: 15/742,374

(22) PCT Filed: Jul. 4, 2016

(86) PCT No.: PCT/CN2016/088295
§ 371 (c)(1),
(2) Date: Jan. 5, 2018

(87) PCT Pub. No.: WO2017/101304
PCT Pub. Date: Jun. 22, 2017

(65) Prior Publication Data
US 2018/0238522 A1    Aug. 23, 2018

(30) Foreign Application Priority Data

Dec. 16, 2015 (CN) ...................... 2015 2 1054995 U

(51) Int. Cl.
*F21V 14/06*    (2006.01)
*F21L 4/00*     (2006.01)
(Continued)

(52) U.S. Cl.
CPC .............. *F21V 14/065* (2013.01); *F21L 4/00* (2013.01); *F21V 5/006* (2013.01); *F21V 5/008* (2013.01);
(Continued)

(58) Field of Classification Search
CPC .... F21V 14/065; F21V 5/006; G02B 19/0047
See application file for complete search history.

(56) References Cited

U.S. PATENT DOCUMENTS

| 6,741,404 B2* | 5/2004 | Ue | G02B 7/021 |
| | | | 359/811 |
| 2006/0034075 A1* | 2/2006 | Alessio | F21L 4/005 |
| | | | 362/202 |

(Continued)

FOREIGN PATENT DOCUMENTS

| CN | 1662773 A | 8/2005 |
| CN | 201187690 Y | 1/2009 |

(Continued)

*Primary Examiner* — Evan P Dzierzynski
(74) *Attorney, Agent, or Firm* — Eric B. Fugett; Mark A. Pitchford; Pitchford Fugett, PLLC

(57) ABSTRACT

Disclosed is an adjustable round light spot torch, comprising a shell (1), a light source (2), and a control optical path (3), both the light source (2) and the control optical path (3) are arranged in the shell (1), the centres of the light source (2) and the control optical path (3) are on the same straight line, the control optical path (3) comprises a first light condensing group (31) and a second light condensing group (32) that are arranged in sequence, and the first light condensing group (31) is located between the light source (2) and the second light condensing group (32). Light emitted by the light source (2) can be condensed by the first light condensing group (31) firstly, and is then diffused to the second light condensing group (32) after passing through a light filter, a condensed light spot is obtained and emitted after the second light condensing group (32) condenses the light for the second time, and consequently, a concentrated and long-range light ray is obtained, and a projected object can appear layered and transparent like a crystal. During use, a relatively long range can still be realized without changing focal length, and a transmitted light spot is uniform and round. The adjustable round light spot torch is simple in structure and convenient to use.

12 Claims, 1 Drawing Sheet

(51) Int. Cl.
*F21V 5/00* (2018.01)
*F21V 5/04* (2006.01)
*G02B 19/00* (2006.01)

(52) U.S. Cl.
CPC .......... *F21V 5/048* (2013.01); *G02B 19/0014* (2013.01); *G02B 19/0047* (2013.01)

(56) References Cited

U.S. PATENT DOCUMENTS

2010/0027251 A1 2/2010 Shpizel
2011/0267823 A1* 11/2011 Angelini ................. F21L 4/027
362/277

FOREIGN PATENT DOCUMENTS

| CN | 101514798 A | 8/2009 |
|----|-------------|--------|
| CN | 102252278 A | 11/2011 |
| CN | 104295917 A | 1/2015 |
| CN | 205065369 U | 3/2016 |

* cited by examiner

ADJUSTABLE ROUND LIGHT SPOT TORCH

CROSS-REFERENCE TO RELATED APPLICATIONS

This application is a national stage application under 35 U.S.C. 371 ("371 Application") of PCT Patent Application No. PCT/CN2016/088295 filed Jul. 4, 2016, which is a PCT application of Chinese Patent Application No. 201521054995.6 filed Dec. 16, 2015, now Chinese Patent No. CN 205244904 U issued May 18, 2016, which are herein incorporated by reference in their entirety.

STATEMENT REGARDING FEDERALLY SPONSORED RESEARCH OR DEVELOPMENT

Not applicable.

TECHNICAL FIELD

The utility model belongs to a flashlight, in particular to an adjustable circular spot flashlight.

BACKGROUND

With the rapid development of flashlight technology, strong light flashlight, LED, solar power and other kinds of flashlight, some of the flashlight is far away, some short range. For a slightly farther range of flashlight in use, the light emitted by the divergent type, light is not concentrated, short range, the object can not see the level of the sense of the crystal and the sense of permeability.

The utility model aims at providing an adjustable circular spot flashlight, which can solve at least one of the above problems.

SUMMARY

According to one aspect of the utility model, an adjustable round spot flashlight is provided, which includes a casing, a light source and a control light path, the light source and the control light path are all located in the casing, the light source and the center of the control light path are in the same straight line, the control light path includes the first concentrating group and the second concentrating group in The first concentrating group is located between the light source and the second concentrating group, and the adjustable distance between the first concentrating group and the second concentrating group is 55~65 mm.

The utility model has the advantages that the first concentrating group can set the light emitted by the light source for the first time, and then the second concentrating group is distributed to the second concentrating group after a second concentrator, and the light is concentrated and the range is far. The projecting object can embody the sense of layering and crystal. In the course of use, by changing the distance between the first concentrating group and the second concentrating group, and adjusting the distance within the 55~65 mm range, we can change the spot size after the light source is shot, To meet the requirements of different occasions, to achieve a far range, transmission spot for the uniform circular, simple structure, easy to use.

In some embodiments, the second concentrating group can move 55~65 mm to one side of the first concentrating group. Thus, it can meet the adjustable size of the circular spot light.

In some embodiments, the first concentrating group and light source can move 55~65 mm to the side of the second concentrating group. Thus, it can meet the adjustable size of the circular spot light.

In some embodiments, the distance between the first concentrating group and the second concentrating group is 60~160 mm. Thus, it facilitates the divergence and convergence of light between the two. Thus, it is convenient for the first concentrating group to converge on the second concentrating group to meet the high intensity of light emitted by the second concentrating group.

In some embodiments, the first convex lens and the second convex lens, the first convex lens and the second convex lens are all planar, the other side is convex, and the distance between the convex of the first convex lens and the convex of the second convex lens is 0.4~0.6 mm. From this, the light emitted by the first convex lens is directly acting on the second convex lens, which can get the light from the light source to effectively converge and improve the intensity and brightness of the light emitted.

In some embodiments, the distance between the light source and the first concentrating group and the light source is 0~20 mm, the first convex lens is the same as the second convex lens, and the convex diameter of the first convex lens is 9~25 mm. Thus, it is ensured that the first concentrating group can collect the light emitted by the light source at close range, and then disperse the second convex lens in the casing range, so that the light can converge on the second concentrating group.

In some embodiments, the second concentrating group includes planar concave and the third convex lens, the planar concave and the third convex lens are the objective glues, and the third convex lens has a 28~100 mm diameter. Thus, the second concentrating group will be assembled by the light after the first concentrating group, which can better obtain the circular spot and the light range is far away.

In some embodiments, the focal length f of the objective glue is 75.21~79.21 mm. Thus, it is ensured that the second concentrating group can effectively receive the light from the first concentrating group.

In some embodiments, the distance between the light source and the first concentrating group is 14~14.3 mm. Thus, the light emitted by the light can be effectively assembled in the first concentrating group.

DETAILED DESCRIPTION

The utility model is described in detail with the attached drawings below.

Figure 1:
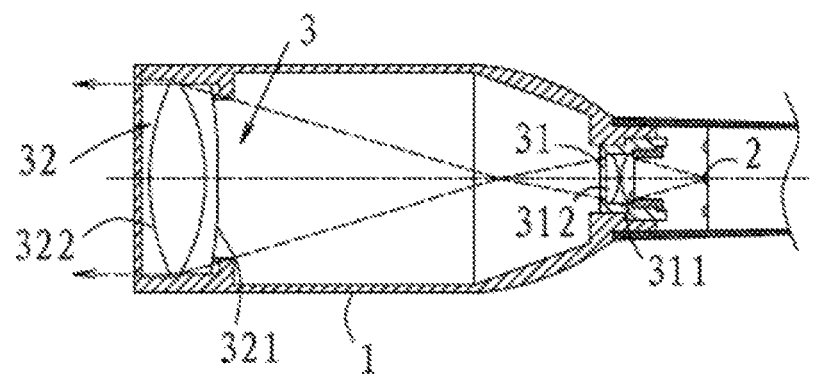
FIG. 1 is the working principle schematic diagram of the adjustable circular spot flashlight of the utility model.

Refer to FIG. 1: Adjustable round spot flashlight, including Shell 1, light source 2 and control light Path 3, the light source 2 and the control Light Road 3 are located in the Shell 1, the light source 2 is the LED light bead, the light source 2 and the Control Light Path 3 center in the same line, the control light Path 3 includes the first concentrating group 31 and the second concentrating group 32, in turn, The first concentrating group is 31 places between the light source 2 and the second concentrating group 32. The distance between the light source 2 and the first condensing group 31 is 14~14.3 mm, preferably 14.22 mm, and the light source 2 emits light and is assembled by the first concentrating group 31. The control light Path 3 is placed in the flashlight Shell 1, meet the requirements of use, so that the torch led portrait projection, and in the range of 3~200 meters are round, and can clearly see the edge of the circle, the object can be projected to clearly see the level and sense of permeability. The dotted line in FIG. 1 represents the divergence direction of the light.

Figure 2:
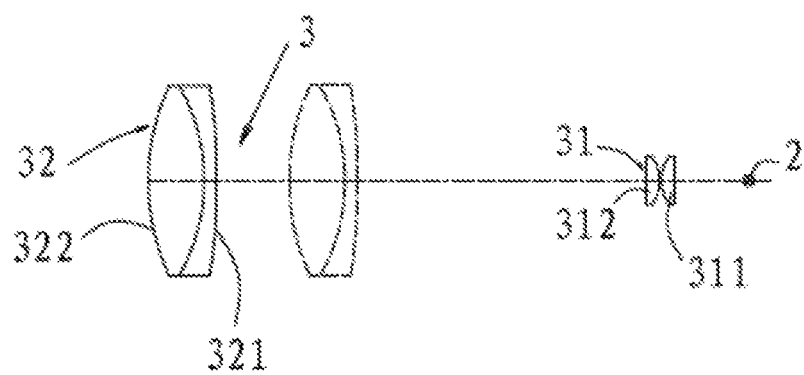
FIG. 2 is a schematic diagram of the use state of the adjustable circular spot flashlight in the utility model.

Among them, the adjustable distance between the first concentrating group 31 and the second concentrating group 32 is 55~65 mm, preferably 60 mm, that is, in some embodiments (as shown in FIG. 2, the dotted line indicates the position of the second concentrating group 32), and the second concentrating group 32 can move 55~65 mm to the first concentrating group 311 sides, preferably 60 mm; Thus, the second concentrating group 32 is close to the first concentrating group of 31 time spots and the spot becomes larger when the light rays from the second concentrating group 32 are formed into a circular spot. Thus, the spot size can be adjusted.

Figure 3:
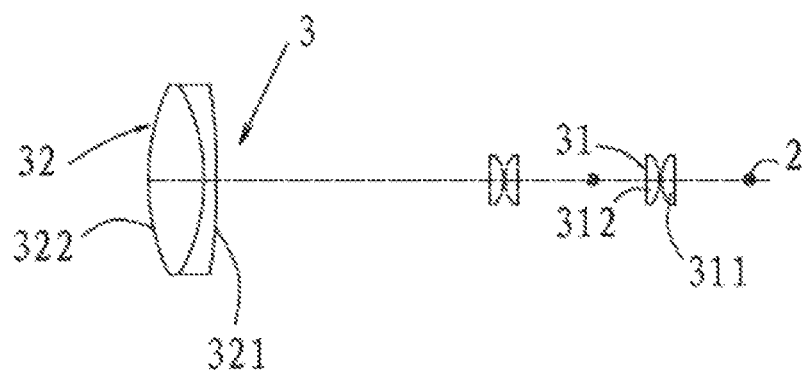
FIG. 3 is a schematic diagram of another use state in the adjustable round spot flashlight of the utility model.

Alternatively, in other implementations (as shown in FIG. 3, the dotted line indicates the position of the first concentrating group 31 and the light Source 2 move), the first concentrating group 31 and the light source 2 can move 55~65 mm to the second concentrating group 321 side, preferably 60 mm. Thus, the spot is reduced when the first concentrating group 31 is close to the second concentrating group 32 when the light rays from the second concentrating group 32 are formed to form a circular spot. Thus, the spot size can be adjusted.

The distance between the first concentrating group 31 and the second concentrating group 32 is 60~160 mm, preferably 100 mm, so that the first concentrating group 31 will converge on the light source 2, and then function in the second concentrating group 32 after divergence, to ensure that the second concentrating group 32 can converge the light.

The first concentrating group 31 includes the first convex lens 311 and the second convex lens 312, the first convex lens 311 and the second convex lens 312 side All is the plane, the other side is convex, the distance between the convex of the first convex lens 311 and the convex of the second convex lens 312 is 0.4~0.6 mm, preferably 0.5 mm.

The light source 2 and the first condensing group 31 and the light source 2 distance is the 0~20 mm, preferably 10 mm, in the use process the light source 2 also may cling to the first convex lens 311, the first convex lens 311 and the second convex lens 312's structure is same, the first convex lens 311 convex diameter is 9~25 mm, preferably 9 mm The plane side of the first convex lens 311 is opposite the light source 2, so that the light emitted by the light source 2 can directly effect on the first convex lens 311, the convex side of the first convex lens 311 converge on the light; after the first convex lens 311, the light is concentrated on the convex surface of the second convex lens The light is assembled after the second convex lens 312. Thus, the first concentrating group 31 can collect the light emitted from 2 light source, and the light intensity is larger and brighter.

The second concentrating group 32 includes planar concave 321 and third convex lens 322, plane concave 321 and third convex lens 322 as the objective glue, the third convex lens 322 diameter is 28~100 mm, preferably 36 mm, The focal length f of the objective glue is 75.21~79.21 mm, preferably 77.21 mm. The second concentrating group 32 is arranged outside the convergence point of the second convex lens 312, which causes the light to converge after the second convex lens 312 to disperse and function on the second concentrating group 32. The second concentrating group 32, through the convergence of the light to the convergence after the injection, so as to obtain a circular and uniform light spot, high intensity, range far.

The above mentioned is only the optimal mode of implementation of the utility model, it should be pointed out that for the general technical personnel in this field, without leaving the concept of the utility model, some deformation and improvement can be made, which belong to the protection scope of the utility model.

What is claimed is:

1. An adjustable round spot flashlight, comprising:
   a housing (1);
   a light source (2); and
   a control light path (3), comprising
      a first concentrating group (31) including a first plano-convex lens defined at least in part by a first convex surface (311), and a second plano-convex lens defined at least in part by a second convex surface (312); and
      a second concentrating group (32);
   wherein:
      the light source (2) and the control light path (3) are arranged in the housing (1);
      the light source (2) is in the same line as a center of the control light path (3);
      the first concentrating group (31) is positioned between the light source (2) and the second concentrating group (32);
      a distance between the first concentrating group (31) and the second concentrating group (32) is between 55 mm and 160 mm;
      the second concentrating group (32) can be displaced between 55 mm and 65 mm relative to the first concentrating group (31); and
      a distance between the first convex surface (311) and the second convex surface (312) is between 0.4 mm and 0.6 mm.

2. The flashlight of claim 1, wherein
   a distance between the light source (2) and the first concentrating group (31) is between 0 mm and 20 mm; and
   a diameter of the first and the second convex surfaces (311 and 312) is between 9 mm and 25 mm.

3. The flashlight of claim 2, wherein the second concentrating group (32) comprises
   a plano-concave lens (321); and
   a bi-convex lens (322) having a diameter between 28 mm and 100 mm;
   wherein the plano-concave lens (321) and the bi-convex lens (322) are glued to each other.

4. The flashlight of claim 3, wherein a focal length f of the second concentrating group (32) is between 75.21 mm and 79.21 mm.

5. The flashlight of claim 3, wherein a distance between the light source (2) and the first concentrating group (31) is between 14 mm and 14.3 mm.

6. An adjustable round spot flashlight, comprising:
   a housing (1);
   a light source (2); and
   a control light path (3) comprising:
      a first concentrating group (31); and
      a second concentrating group (32);
   wherein:

the light source (2) and the control light path (3) are arranged in the housing (1);

the light source (2) is in the same line as a center of the control light path (3);

the first concentrating group (31) is positioned between the light source (2) and the second concentrating group (32);

a distance between the first concentrating group (31) and the second concentrating group (32) is between 55 mm and 160 mm; and the first concentrating group (31) and the light source (2) can move between 55 mm and 65 mm towards the second concentrating group (32).

7. The flashlight of claim 6, wherein the distance between the first concentrating group (31) and the second concentrating group (32) is between 55 mm and 65 mm.

8. The flashlight of claim 7, wherein the first concentrating group (31) comprises a first plano-convex lens defined at least in part by a first convex surface (311); and a second plano-convex lens defined at least in part by a second convex surface (312);

wherein a distance between the first convex surface (311) and the second convex surface (312) is between 0.4 mm and 0.6 mm.

9. The flashlight of claim 8, wherein a distance between the light source (2) and the first concentrating group (31) is between 0 mm and 20 mm; and a diameter of the first and the second convex surfaces (311 and 312) is between 9 mm and 25 mm.

10. The flashlight of claim 9, wherein the second concentrating group (32) comprises a plano-concave lens (321); and a bi-convex lens (322) having a diameter between 28 mm and 100 mm;

wherein the plano-concave lens (321) and the bi-convex lens (322) are glued to each other.

11. The flashlight of claim 10, wherein a focal length f of the second concentrating group (32) is between 75.21 mm and 79.21 mm.

12. The flashlight of claim 10, wherein a distance between the light source (2) and the first concentrating group (31) is between 14 mm and 14.3 mm.

* * * * *